(12) United States Patent
Wu et al.

(10) Patent No.: US 10,911,126 B2
(45) Date of Patent: Feb. 2, 2021

(54) METHOD, APPARATUS AND SYSTEM FOR PILOT CONFIGURATION AND INFORMATION FEEDBACK

(71) Applicant: ZTE CORPORATION, Shenzhen (CN)

(72) Inventors: Hao Wu, Shenzhen (CN); Yu Ngok Li, Shenzhen (CN); Yijian Chen, Shenzhen (CN); Zhaohua Lu, Shenzhen (CN); Shujuan Zhang, Shenzhen (CN); Yuhong Gong, Shenzhen (CN); Xiaopeng Wang, Shenzhen (CN); Meng Mei, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 45 days.

(21) Appl. No.: 16/323,988

(22) PCT Filed: Aug. 7, 2017

(86) PCT No.: PCT/CN2017/096223
§ 371 (c)(1),
(2) Date: Jun. 5, 2019

(87) PCT Pub. No.: WO2018/028544
PCT Pub. Date: Feb. 15, 2018

(65) Prior Publication Data
US 2019/0296817 A1    Sep. 26, 2019

(30) Foreign Application Priority Data
Aug. 11, 2016  (CN) .......................... 2016 1 0659496

(51) Int. Cl.
*H04B 7/06* (2006.01)
*H04B 7/0413* (2017.01)
(Continued)

(52) U.S. Cl.
CPC ............. *H04B 7/0686* (2013.01); *H04B 7/04* (2013.01); *H04B 7/0413* (2013.01); *H04B 7/06* (2013.01);
(Continued)

(58) Field of Classification Search
CPC .......... H04B 7/0686; H04B 7/04; H04B 7/06; H04B 7/0413; H04B 7/0868;
(Continued)

(56) References Cited

U.S. PATENT DOCUMENTS

| 2013/0107810 A1* | 5/2013 | Khan | ..................... | H04L 1/0015 |
| | | | | 370/328 |
| 2016/0127093 A1* | 5/2016 | Jiang | ..................... | H04W 72/06 |
| | | | | 370/330 |

FOREIGN PATENT DOCUMENTS

| CN | 102821393 A | 12/2012 |
| CN | 103220069 A | 7/2013 |
| CN | 105636105 A | 6/2016 |

* cited by examiner

*Primary Examiner* — Kabir A Timory
(74) *Attorney, Agent, or Firm* — Li & Cai Intellectual Property (USA) Office (57) ABSTRACT

A method for pilot configuration includes: a base station configuring K1 sets of pilot resources of a first type and K2 sets of pilot resources of a second type; the base station transmitting the K1 sets of pilot resources of the first type to a terminal in a first transmission mode, and transmitting the K2 sets of pilot resources of the second type to the terminal in a second transmission mode; and the base station receiving a first type of feedback information fed back by the terminal according to the measurement of the pilot resources of the first type, and receiving a second type of feedback information fed back by the terminal according to the measurement of the pilot resources of the second type, wherein K1 and K2 are integers equal to or greater than 1.

19 Claims, 7 Drawing Sheets

```
┌─────────────────────┐
│   First Acquiring   │
│                     │
│     Module 52       │
└──────────┬──────────┘
           │
           │
    ┌──────┴───────────────┐
    │  Feedback Module 54  │
    │                      │
    └──────────────────────┘
```

(51) Int. Cl.
*H04B 7/08* (2006.01)
*H04L 5/00* (2006.01)
*H04B 7/04* (2017.01)

(52) U.S. Cl.
CPC ............. *H04B 7/0868* (2013.01); *H04L 5/00* (2013.01); *H04L 5/0048* (2013.01)

(58) Field of Classification Search
CPC .... H04B 7/0456; H04B 7/0417; H04B 7/063; H04B 7/0626; H04B 7/0632; H04L 5/00; H04L 5/0048; H04L 5/0007; H04L 5/0091; H04L 5/0055; H04L 5/0057
See application file for complete search history.

METHOD, APPARATUS AND SYSTEM FOR PILOT CONFIGURATION AND INFORMATION FEEDBACK

CROSS REFERENCE

This application is the 371 application of PCT Application No. PCT/CN2017/096223 filed Aug. 7, 2017, which is based upon and claims priority to Chinese Patent Application No. 201610659496.2, filed on Aug. 11, 2016 the entire contents thereof are incorporated herein by reference.

TECHNICAL FIELD

The present disclosure relates to the field of communications, and more particularly, to a method, an apparatus and a system for pilot configuration and information feedback.

BACKGROUND

In a wireless communication system, a multi-antenna technology is an effective means to expand the channel capacity. By arranging a plurality of antennas at a sending terminal and a receiving terminal, a power gain is formed by means of the number of streams transmitted or matching channels. One principle of the multi-antenna technology is to use some characteristics of the channel to form a multi-layer transmission matching channel characteristics. The radiation direction of a signal is targeted, which can effectively improve system performance and obtain significant performance improvement without increasing bandwidth and power. Therefore, as a promising technology, the multi-antenna technology is widely used in existing systems. The data transfer performance of a multi-antenna system depends mainly on measurement and feedback of channel information. Therefore, the measurement and feedback of the channel information are the core contents of the multi-antenna technology. How to ensure the accuracy, overhead and robustness of channel measurement and channel information feedback becomes an important issue.

The measurement and feedback of channel state information (CSI) is designed to be relatively simple in the early long time evolution (LTE) system version. However, as accuracy requirements are more and more demanding, and a significant growth is not expected on pilot overhead, feedback overhead and quantization complexity, CSI measurement and feedback technologies become more and more complex to pursue a higher quantization efficiency. In addition, since it is required to adapt to different scenarios, the antenna configuration has good adaptability and a large number of new designs are introduced. Some basic contents related to CSI measurement and quantitative feedback are introduced below.

CSI Measurement Reference Signal

A channel state information reference signal (CSI-RS) may be used for measurement of downlink channel information. There are two types of CSI-RS: non-precoded CSI-RS (abbreviated as NP CSI-RS) and beamformed CSI-RS (abbreviated as BFed CSI-RS). For the NP CSI-RS, a base station acquires channel state information by transmitting pilot resources at all ports, receiving pilot resources by a user, and measuring and feeding back channel information. For the BFed CSI-RS, the base station configures a precoding matrix for different port groups, and loads, on K sets of CSI-RS resources (K>1), the CSI-RS on the precoding matrix. The user measures an equivalent channel and feeds back the CSI on the best CSI-RS resources.

Two Feedback Modes of CSI

Mainly there are two modes for feedback of terminal CSI. The base station may be provided with a terminal to measure and quantize the channel information, and may periodically feed back quantized CSI info illation (including rank indicate (RI)/precoding matrix index (PMI)/channel quality information (CQI)) via a physical uplink control channel (PUCCH). When needed, the base station may also aperiodically trigger the terminal to report the CSI information (including RI/PMI/CQI), to overcome the problem that the periodic feedback is not timely enough and the CSI quantization accuracy is limited by the control channel overhead.

Two Feedback Classes of CSI

There are two classes of measurement and feedback of the channel information: Class A and Class B.

Class A: the base station sends a CSI-RS, which is generally a non-precoded CSI-RS. User equipment (UE) directly performs channel measurement and CSI quantization based on the CSI-RS to obtain RI/PMI/CQI. These contents are fed back on a PUCCH or PUSCH, and the feedback content is more, including the beam direction of a broadband.

Class B: the CSI-RS transmitted by the base station generally is a beamformed CSI-RS. The UE may need to select a beamformed CSI-RS, and then perform quantitative feedback of the channel information based on the selected CSI-RS, including CSI-RS resource index (CRI) selection information, and RI/PMI/CQI information corresponding to a subset of the selected CSI-RS measurement resources.

Figure 1:
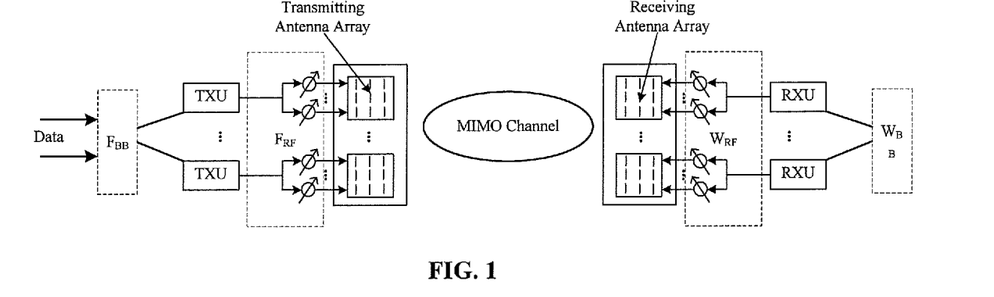
FIG. 1 is a schematic diagram of a method for hybrid beam forming in related art.

Hybrid Beamforming:

The above CSI measurement and feedback contents have been standardized in recent versions of LTE. Recently, with the rise of 5G technology, high frequency band and large-scale antenna arrays have received more and more attention. When the working frequency band is higher, more antennas may be arranged in smaller space, and meanwhile proper correlation between the antennas is ensured. Therefore, the high frequency band makes the arrangement of large-scale antennas possible. It is considered the balance between the performance of massive multiple-input multiple output (MIMO) and the complexity of baseband signal processing. FIG. 1 is a schematic diagram of a hybrid beamforming method in the related technologies. As shown in FIG. 1, the sending terminal includes $N_{RF}$ radio frequency (RF) chains, wherein each RF chain is connected to $M_{AE}$ antenna array. On each RF chain, analog beamforming is implemented using RF precoding $F_{RF}$ by means of phase modulation, i.e., a mapping from a baseband port to an antenna array. Whereas on a plurality of RF chains, digital beamforming is implemented using baseband precoding $F_{BB}$, i.e., a mapping from each transmission layer to a baseband port. The final precoding is a hybrid beamforming determined by $F_{RF}F_{BB}$. Therefore, for a high-frequency MIMO system, beam training may be performed through a plurality of CSI-RS resources to obtain suitable hybrid beam information, and the final CSI information such as the PMI/RI/CQI or a channel matrix is fed back based on the hybrid beam information.

For the traditional MIMO, the terminal calculates the CSI based on a single user (abbreviated as SU) hypothesis, thus, when a multi-user (abbreviated as MU) pairing is performed in an actual data transfer phase, a channel or interference with the user may be inconsistent with the CSI measurement feedback, which may result in incomplete or inaccurate CSI fed back by the user. In addition, when the CSI is acquired based a hybrid beamforming architecture, the number of ports configured by the base station for a certain user and the number of beams may be inconsistent with the number of stronger beams that can be actually measured by the user, which also may result in incomplete or inaccurate CSI fed back by the user.

In view of the above problems in the related technologies, there is no effective solution as yet.

This section provides background information related to the present disclosure which is not necessarily prior art.

SUMMARY

Embodiments of the present invention provide a method, an apparatus and a system for pilot configuration and information feedback, to at least solve the problem in the related art that CSI fed back by a user terminal is incomplete or inaccurate, when performing MU pairing during an actual data transmission phase or when acquiring the CSI in a hybrid beam forming based structure.

According to an aspect of the present invention, there is provided a method for pilot configuration. The method includes: configuring, by a base station, $K_1$ sets of pilot resources of a first type and $K_2$ sets of pilot resources of a second type; transmitting, by the base station, the $K_1$ sets of pilot resources of the first type to a terminal in a first transmission mode, and transmitting, by the base station, the $K_2$ sets of pilot resources of the second type to the terminal in a second transmission mode; and receiving, by the base station, a first type of feedback information fed back by the terminal according to measurement of the pilot resources of the first type, and receiving, by the base station, a second type of feedback information fed back by the terminal according to measurement of the pilot resources of the second type. Both $K_1$ and $K_2$ are integers equal to or greater than 1.

According to another aspect of the present invention, there is provided a method for information feedback. The method includes: acquiring, by a terminal, $K_1$ sets of pilot resources of a first type transmitted by a base station in a first transmission mode and $K_2$ sets of pilot resources of a second type transmitted by the base station in a second transmission mode; and feeding back, by the terminal, a first type of feedback information to the base station according to measurement of the pilot resources of the first type, and feeding back, by the terminal, a second type of feedback information to the base station according to measurement of the pilot resources of the second type. Both $K_1$ and $K_2$ are integers equal to or greater than 1.

According to still another aspect of the present invention, there is provided an apparatus for pilot configuration applied to a base station side. The apparatus includes: a configuring module, configured to configure $K_1$ sets of pilot resources of a first type and $K_2$ sets of pilot resources of a second type; a transmitting module, configured to transmit the K sets of pilot resources of the first type to a terminal in a first transmission mode, and transmit the $K_2$ sets of pilot resources of the second type to the terminal in a second transmission mode; and a receiving module, configured to receive a first type of feedback information fed back by the terminal according to measurement of the pilot resources of the first type, and receive a second type of feedback information fed back by the terminal according to measurement of the pilot resources of the second type. Both $K_1$ and $K_2$ are integers equal to or greater than 1.

According to still another aspect of the present invention, there is provided a terminal. The terminal includes: a processor; a memory configured to store a processor-executable instruction; and a transfer apparatus configured to perform data interaction with outside. The processor is configured to control the transfer apparatus to acquire $K_1$ sets of pilot resources of a first type transmitted by a base station in a first transmission mode and $K_2$ sets of pilot resources of a second type transmitted by the base station in a second transmission mode. The processor is further configured to feed back a first type of feedback information to the base station according to measurement of the pilot resources of the first type, and feed back a second type of feedback information to the base station according to measurement of the pilot resources of the second type. Both $K_1$ and $K_2$ are integers equal to or greater than 1.

According to still another aspect of the present invention, there is provided a system for pilot configuration and information feedback. The system includes the apparatus for pilot configuration applied to a base station and the apparatus for information feedback applied to a terminal.

According to a still another embodiment of the present disclosure, there is further provided a storage medium. The storage medium is configured to store program codes for performing following steps:

configuring $K_1$ sets of pilot resources of a first type and $K_2$ sets of pilot resources of a second type; transmitting the $K_1$ sets of pilot resources of the first type to a terminal in a first transmission mode, and transmitting the $K_2$ sets of pilot resources of the second type to the terminal in a second transmission mode; and receiving a first type of feedback information fed back by the terminal according to measurement of the pilot resources of the first type, and receiving a second type of feedback information fed back by the terminal according to measurement of the pilot resources of the second type. Both $K_1$ and $K_2$ are integers equal to or greater than 1.

According to a still another embodiment of the present disclosure, there is further provided a storage medium. The storage medium is configured to store program codes for performing following steps:

acquiring $K_1$ sets of pilot resources of a first type transmitted by a base station in a first transmission mode and $K_2$ sets of pilot resources of a second type transmitted by the base station in a second transmission mode; and feeding back a first type of feedback information to the base station according to measurement of the pilot resources of the first type, and feeding back a second type of feedback information to the base station according to measurement of the pilot resources of the second type. Both $K_1$ and $K_2$ are integers equal to or greater than 1.

According to the embodiments of the present invention, the base station configures $K_1$ sets of pilot resources of a first type and $K_2$ sets of pilot resources of a second type, transmits the $K_1$ sets of pilot resources of the first type to a terminal in a first transmission mode, and transmits the $K_2$ sets of pilot resources of the second type to the terminal in a second transmission mode, wherein the pilot resources of the first type and the pilot resources of the second type are used for terminal measurement. Furthermore, the base station feeds back a first type of feedback information and a second type of feedback information. In this way, the problem in the related art that CSI fed back by a user terminal is incomplete or inaccurate, when performing MU pairing during an actual data transmission phase or when acquiring the CSI in a hybrid beam forming based structure, is solved.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

DETAILED DESCRIPTION

The present disclosure will be described below in detail with reference to the accompanying drawings and in combination with the embodiments. It should also be noted that the embodiments in the present disclosure and the features in the embodiments may be combined with each other on a non-conflict basis.

It should be explained that in the specification, the claims and the foregoing accompanying drawings of the present disclosure, a term (such as a first or a second) is intended to separate between similar objects but is not intended to describe a specific sequence or precedence order.

Embodiment 1

Figure 2:
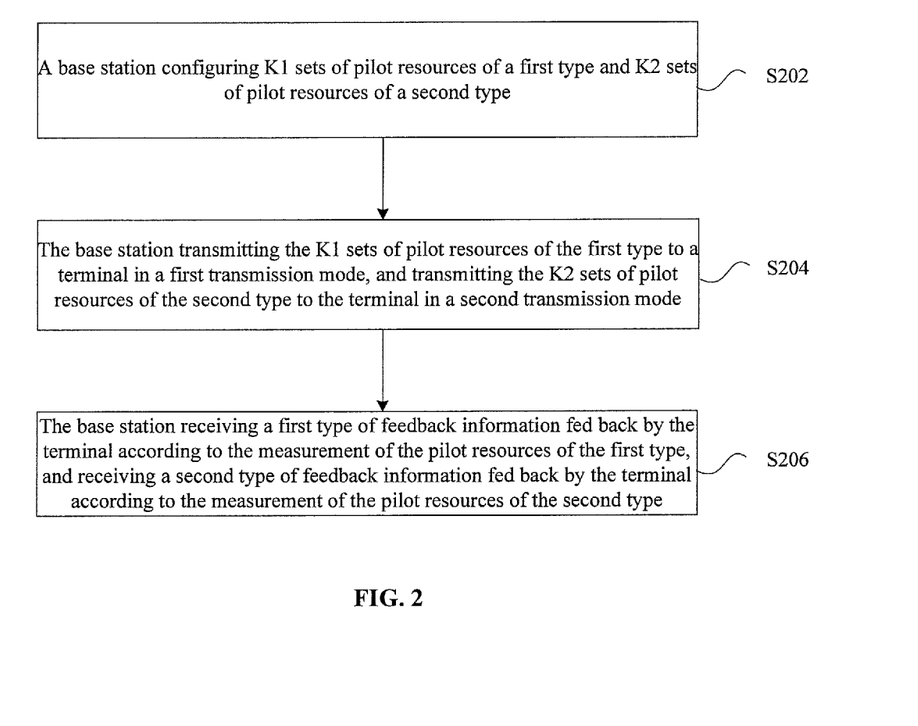
FIG. 2 is a flowchart of a method for pilot configuration according to an embodiment of the present invention.

In this embodiment, there is provided a method for pilot configuration and a method for information feedback. FIG. 2 is a flowchart of the method for pilot configuration according to an embodiment of the present disclosure. As shown in FIG. 2, the flow includes following steps.

In Step S202, a base station configures $K_1$ sets of pilot resources of a first type and $K_2$ sets of pilot resources of a second type.

In Step S204, the base station transmits the $K_1$ sets of pilot resources of the first type to a terminal in a first transmission mode, and transmits the $K_2$ sets of pilot resources of the second type to the terminal in a second transmission mode.

In Step S206, the base station receives a first type of feedback information fed back by the terminal according to measurement of the pilot resources of the first type, and receives a second type of feedback information fed back by the terminal according to measurement of the pilot resources of the second type.

Both $K_1$ and $K_2$ are integers equal to or greater than 1.

According to this embodiment, from the Step S202 to the Step S206, the base station configures $K_1$ sets of pilot resources of a first type and $K_2$ sets of pilot resources of a second type, transmits the $K_1$ sets of pilot resources of the first type to a terminal in a first transmission mode, and transmits the $K_2$ sets of pilot resources of the second type to the terminal in a second transmission mode, wherein the pilot resources of the first type and the pilot resources of the second type are used for terminal measurement. Furthermore, the base station feeds back a first type of feedback information and a second type of feedback information. In this way, the problem in the related art that CSI fed back by a user terminal is incomplete or inaccurate, when performing MU pairing during an actual data transmission phase or when acquiring the CSI in a hybrid beam forming based structure, is solved.

In an optional implementation of this embodiment, the pilot resources of the first type and the pilot resources of the second type respectively include at least one of: pilot occupation time-frequency resources, a pilot port, a pilot sequence, and a pilot use precoding matrix.

The first type of feedback information includes at least one of: N sets of pilot resource indication information, pilot resource grouping indication information, and a second type of pilot resource information recommended by the terminal. The N is an integer greater than or equal to 1, and the N is less than or equal to $K_1$. The second type of pilot resource information recommended by the terminal includes at least one of: a time/frequency domain resource location for transmitting a second type of pilot frequency recommended by the terminal, a port for transmitting the second type of pilot frequency recommended by the terminal, a second type of pilot sequence information recommended by the terminal, a second type of pilot use precoding information recommended by the terminal, and a second type of pilot resource grouping information recommended by the terminal.

In another optional implementation of this embodiment, the second type of feedback information in this embodiment includes at least one of: channel quality indication information, channel rank indication information, pre-coding indication information, equivalent channel matrix information, equivalent channel feature vector information, and equivalent channel covariance matrix information.

Optionally, the base station transmits, to the terminal, a physical layer signaling and/or a higher layer signaling, wherein the physical layer signaling and/or the higher layer signaling are used for informing the terminal of a fact that the pilot resources used by the terminal belong to the pilot resources of the first type or the pilot resources of the second type.

It is to be noted that the first transmission mode and the second transmission mode respectively include at least one of a transmission mode using beamformed CSI-RS, a periodic transmission mode, and an aperiodic transmission mode.

Based on this transmission mode, when the first transmission mode is the periodic transmission mode, the base station informs the terminal of the pilot resources of the first type via the physical layer signaling and/or the higher layer signaling.

When the second transmission mode is the periodic transmission mode, the base station informs, via the physical layer signaling and/or the higher layer signaling, the terminal of the pilot resources of the second type and/or information on the number of times of transmitting the pilot resources of the second type.

Optionally, the base station informs the terminal of a value of $K_1$ and/or the pilot resources of the first type via the physical layer signaling and/or the higher layer signaling.

Furthermore, the base station informs, via the physical layer signaling and/or the higher layer signaling, the terminal of the pilot resource grouping information of the pilot resources of the second type, and/or mapping information between the pilot resources of the second type and the pilot resources of the first type.

Optionally, the base station determines, based on the first type of feedback information, a value of $K_2$ and/or the pilot resources of the second type, and informs, via the physical layer signaling and/or the higher layer signaling, the terminal of the value of $K_2$ and/or the pilot resources of the second type.

It is to be noted that the $K_2$ sets of pilot resources of the second type are a subset of the $K_1$ sets of pilot resources of the first type, and $K_2$ is less than or equal to $K_1$.

On this basis, when the base station configures ($K_1$=1) sets of pilot resources of the first type, the base station prohibits configuring the pilot resources of the first type. The set of the first type of feedback information includes at least one of: channel quality indication information, channel rank indication information, pre-coding indication information, equivalent channel matrix information, equivalent channel feature vector information, and equivalent channel covariance matrix information.

On this basis, the base station informs, via the physical layer signaling and/or the higher layer signaling, the terminal of the resource subset, serving as the pilot resources of the second type, among the pilot resources of the first type.

Furthermore, in this embodiment, the base station also may release or activate, via the physical layer signaling and/or the higher layer signaling, pilot resources except the pilot resources of the second type among the pilot resources of the first type.

Embodiment 2

Figure 3:
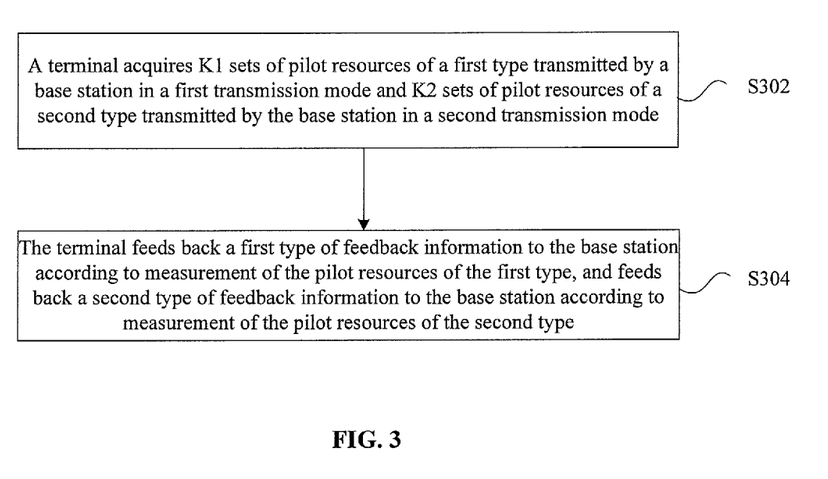
FIG. 3 is a flowchart of a method for information feedback according to an embodiment of the present invention.

FIG. 3 is a flowchart of a method for information feedback according to an embodiment of the present invention. As shown in FIG. 3, the method includes following steps.

In Step S302, a terminal acquires $K_1$ sets of pilot resources of a first type transmitted by a base station in a first transmission mode and $K_2$ sets of pilot resources of a second type transmitted by the base station in a second transmission mode.

In Step S304, the terminal feeds back a first type of feedback information to the base station according to measurement of the pilot resources of the first type, and feeds back a second type of feedback information to the base station according to measurement of the pilot resources of the second type.

Both $K_1$ and $K_2$ are integers equal to or greater than 1.

It is to be noted that the pilot resources of the first type and the pilot resources of the second type respectively include at least one of: pilot occupation time-frequency resources, a pilot port, a pilot sequence, and a pilot use precoding matrix.

The first type of feedback information includes at least one of: N sets of pilot resource indication information, pilot resource grouping indication information, and a second type of pilot resource information recommended by the terminal. The N is an integer greater than or equal to 1, and the N is less than or equal to $K_1$.

In an optional implementation of this embodiment, the second type of pilot resource information recommended by the terminal includes at least one of: a time/frequency domain resource location for transmitting a second type of pilot frequency recommended by the terminal, a port for transmitting the second type of pilot frequency recommended by the terminal, a second type of pilot sequence information recommended by the terminal, a second type of pilot use precoding information recommended by the terminal, and a second type of pilot resource grouping information recommended by the terminal.

Based on the second type of pilot resource information recommended by the terminal, when the first type of feedback information includes the second type of pilot resource information recommended by the terminal, the terminal prohibits executing an operation of measuring the second type of feedback information outside the second type of pilot resource information recommended.

In an optional implementation of this embodiment, the second type of feedback information includes at least one of: channel quality indication information, channel rank indication information, pre-coding indication information, equivalent channel matrix information, equivalent channel feature vector information, and equivalent channel covariance matrix information.

Optionally, in this embodiment, the terminal receives a physical layer signaling and/or a higher layer signaling transmitted by the base station, wherein the physical layer signaling and/or the higher layer signaling are used for indicating that the pilot resources measured by the terminal belong to the pilot resources of the first type or the pilot resources of the second type.

It is to be noted that the first transmission mode and the second transmission mode in this embodiment respectively include at least one of a transmission mode using beamformed CSI-RS, a periodic transmission mode, and an aperiodic transmission mode.

On this basis, when the first transmission mode is the periodic transmission mode, the terminal acquires, via the physical layer signaling and/or the higher layer signaling transmitted by the base station, the pilot resources of the second type. When the second transmission mode is the periodic transmission mode, the terminal acquires, via the physical layer signaling and/or the higher layer signaling transmitted by the base station, the pilot resources of the second type and/or information on the number of times of transmitting the pilot resources of the second type.

Furthermore, the terminal also may acquire, via the physical layer signaling and/or the higher layer signaling, a value of $K_1$ and a value of $K_2$, and the pilot resources of the first type and the pilot resources of the second type. Furthermore, the terminal acquires, via the physical layer signaling and/or the higher layer signaling, the pilot resource grouping information of the pilot resources of the second type, and/or mapping information between the pilot resources of the second type and the pilot resources of the first type.

The terminal determines, based on the pilot resource grouping information and/or the mapping information, a reception mode and/or a measurement mode of the pilot resources of the second type.

It is to be noted that the $K_2$ sets of pilot resources of the second type are a subset of the $K_1$ sets of pilot resources of the first type, and $K_2$ is less than or equal to $K_1$.

For example, when the $K_{1=1}$, the first type of feedback information includes at least one of: channel quality indication information, channel rank indication information, pre-coding indication information, equivalent channel matrix information, equivalent channel feature vector information, and equivalent channel covariance matrix information.

Optionally, the terminal acquires, via the physical layer signaling and/or the higher layer signaling, release information and activation information of pilot resources except the pilot resources of the second type among the pilot resources of the first type. After the terminal acquires the release information of the pilot resources except the pilot resources of the second type among the pilot resources of the first type, the terminal prohibits measuring or feeding back, on the released pilot resources, the second type of feedback information. After the terminal acquires the activation information of pilot resources except the pilot resources of the second type among the pilot resources of the first type, the terminal measures or feeds back, on the activated pilot resources, the first type of feedback information.

Optionally, the terminal acquires, from the pilot resources of the first type via the physical layer signaling and/or the higher layer signaling, resource subset information serving as the pilot resources of the second type. The terminal feeds back, on resources indicated by the resource subset information, the second type of feedback information, and prohibits feeding back the second type of feedback information outside of the resources indicated by the resource subset information.

It can be known from the description of the foregoing implementation manners, a person skilled in the art may clearly know that the method of the foregoing embodiments may be implemented by means of software and necessary general hardware platform or of course by means of hardware, but in most cases the former is the better implementation manner. Based on such an understanding, the technical solution of the present disclosure in essence or that part of contribution to the prior art may be embodied in the form of software products, which may be stored in storage media (such as ROM/RAM, diskettes or optical disks), including some instructions so that it is possible to execute the method as recited in the embodiments of the present disclosure by a terminal device (a mobile phone, a computer, a server, or a network device, etc.).

Embodiment 3

In this embodiment there is further provided an apparatus for pilot configuration, which is configured to implement the above embodiments and preferred implementations, and what has been described is not repeated any more. As used below, the term "module" may implement software of predetermined functions and/or a combination of software and hardware. The apparatus described in the following embodiments is preferably implemented by software. However, implementation by combination of software and hardware also may be conceived.

Figure 4:
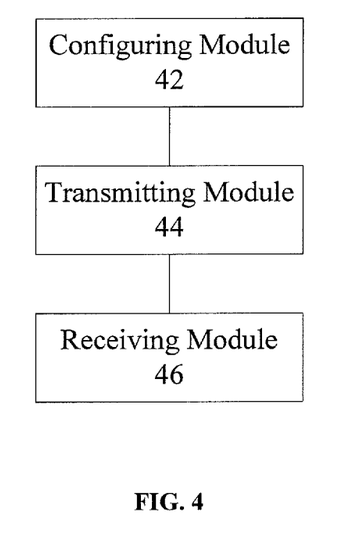
FIG. 4 is a structural block diagram of an apparatus for pilot configuration according to an embodiment of the present invention.

FIG. 4 is a structural block diagram of an apparatus for pilot configuration according to an embodiment of the present invention. The apparatus is applied to a base station side. As shown in FIG. 4, the apparatus includes: a configuring module 42, configured to configure $K_1$ sets of pilot resources of a first type and $K_2$ sets of pilot resources of a second type; a transmitting module 44, coupled to the configuring module 42 and configured to transmit the $K_1$ sets of pilot resources of the first type to a terminal in a first transmission mode, and transmit the $K_2$ sets of pilot resources of the second type to the terminal in a second transmission mode; and a receiving module 46, coupled to the transmitting module 44 and configured to receive a first type of feedback information fed back by the terminal according to measurement of the pilot resources of the first type, and receive a second type of feedback information fed back by the terminal according to measurement of the pilot resources of the second type.

Both $K_1$ and $K_2$ are integers equal to or greater than 1.

It is to be explained that this embodiment corresponds to the apparatus embodiment of the method embodiment 1. Therefore, explanations to the pilot resources of the first type, the pilot resources of the second type, the first transmission mode, the second transmission mode, and values of $K_1$ and $K_2$ in this embodiment correspond to corresponding explanations in the embodiment 1, and thus are not repeated any more herein.

Optionally, the apparatus in this embodiment may further include: a first informing module, configured to inform, when the first transmission mode is a periodic transmission mode, the terminal of the pilot resources of the first type via a physical layer signaling and/or a higher layer signaling; a second informing module, configured to inform via the physical layer signaling and/or the higher layer signaling, when the second transmission mode is the periodic transmission mode, the terminal of the pilot resources of the second type and/or information on the number of times of transmitting the pilot resources of the second type; and a third informing module, configured to inform via the physical layer signaling and/or the higher layer signaling, the terminal of at least one of: pilot resources used by the terminal belonging to the pilot resources of the first type or the pilot resources of the second type; a value of $K_1$, and/or the pilot resources of the first type; and pilot resource grouping information of the pilot resources of the second type, and/or mapping information between the pilot resources of the second type and the pilot resources of the first type.

Optionally, the apparatus in this embodiment may further include a first processing module, configured to determine, based on the first type of feedback information, a value of $K_2$ and/or the pilot resources of the second type, and inform, via the physical layer signaling and/or the higher layer signaling, the terminal of the value of $K_2$ and/or the pilot resources of the second type.

It is to be noted that the $K_2$ sets of pilot resources of the second type are a subset of the $K_1$ sets of pilot resources of the first type, and $K_2$ is less than or equal to $K_1$.

Optionally, the apparatus in this embodiment may further include: a prohibiting module, configured to prohibit configuring the pilot resources of the second type when the configuring module configures ($K_1$=1) sets of pilot resources of the first type. The set of the first type of feedback information includes at least one of: channel quality indication information, channel rank indication information, pre-coding indication information, equivalent channel matrix information, equivalent channel feature vector information, and equivalent channel covariance matrix information.

Optionally, the apparatus in this embodiment may further include: a second processing module, configured to release and activate, via a physical layer signaling and/or a higher layer signaling, pilot resources except the pilot resources of the second type among the pilot resources of the first type; and a fourth informing module, configured to inform, via the physical layer signaling and/or the higher layer signaling, the terminal of the resource subset, serving as the pilot resources of the second type, among the pilot resources of the first type.

It is to be noted that this embodiment also provides a base station corresponding to the apparatus for pilot configuration in this embodiment. The base station includes:

a processor;

a memory configured to store a processor-executable instruction; and a transfer apparatus configured to perform data interaction with outside.

The processor is configured to configure $K_1$ sets of pilot resources of a first type and $K_2$ sets of pilot resources of a second type, and control the transfer apparatus to transmit the $K_1$ sets of pilot resources of the first type to a terminal in a first transmission mode and transmit the $K_2$ sets of pilot resources of the second type to the terminal in a second transmission mode; and control the transfer apparatus to receive a first type of feedback information fed back by the terminal according to measurement of the pilot resources of the first type and receive a second type of feedback information fed back by the terminal according to measurement of the pilot resources of the second type. Both $K_1$ and $K_2$ are integers equal to or greater than 1.

It is to be explained that explanations to the pilot resources of the first type, the pilot resources of the second type, the first transmission mode, the second transmission mode, and values of $K_1$ and $K_2$ involved in the base station correspond to corresponding explanations in the embodiment 1, and thus are not repeated any more herein.

Furthermore, the processor, the memory and the transfer apparatus also may be used for executing functions of other modules in the above apparatus for pilot configuration.

Embodiment 4

In this embodiment there is further provided an apparatus for information feedback. The apparatus is configured to implement the above embodiments and preferred implementations, and what has been described is not repeated any more. As used below, the term "module" may implement software of predetermined functions and/or a combination of software and hardware. The apparatus described in the following embodiments is preferably implemented by software. However, implementation by combination of software and hardware also may be conceived.

Figure 5:
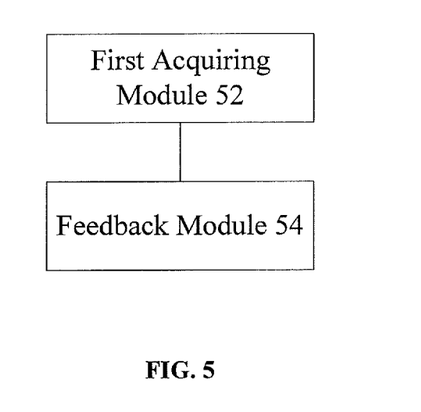
FIG. 5 is a structural block diagram of an apparatus for information feedback according to an embodiment of the present invention.

FIG. 5 is a structural block diagram of an apparatus for information feedback according to an embodiment of the present invention. The apparatus is applied to a terminal side. As shown in FIG. 5, the apparatus includes: a first acquiring module 52, configured to acquire $K_1$ sets of pilot resources of a first type transmitted by a base station in a first transmission mode and $K_2$ sets of pilot resources of a second type transmitted by the base station in a second transmission mode; and a feedback module 54, coupled to the first acquiring module 52 and configured to feed back a first type of feedback information to the base station according to measurement of the pilot resources of the first type, and feed back a second type of feedback information to the base station according to measurement of the pilot resources of the second type. Both $K_1$ and $K_2$ are integers equal to or greater than 1.

It is to be explained that this embodiment corresponds to the apparatus embodiment of the method embodiment 2. Therefore, explanations to the pilot resources of the first type, the pilot resources of the second type, the first transmission mode, the second transmission mode, and values of $K_1$ and $K_2$ in this embodiment correspond to corresponding explanations in the embodiment 2, and thus are not repeated any more herein.

Optionally, the first acquiring module in this embodiment is further configured to acquire, when the first transmission mode is a periodic transmission mode, the pilot resources of the first type via a physical layer signaling and/or a higher layer signaling transmitted by the base station. Furthermore, the first acquiring module is further configured to acquire via the physical layer signaling and/or the higher layer signaling transmitted by the base station, when the second transmission mode is the periodic transmission mode, the pilot resources of the second type and/or information on the number of times of transmitting the pilot resources of the second type. Moreover, the first acquiring module is further configured to acquire, via the physical layer signaling and/or the higher layer signaling, a value of $K_1$ and a value of $K_2$, and the pilot resources of the first type and the pilot resources of the second type.

Optionally, the first acquiring module is further configured to acquire, via a physical layer signaling and/or a higher layer signaling, pilot resource grouping information of the pilot resources of the second type, and/or mapping information between the pilot resources of the second type and the pilot resources of the first type.

Optionally, the apparatus may further include a determining module, configured to determine, based on the pilot resource grouping information and/or the mapping information, a reception mode and/or a measurement mode of the pilot resources of the second type.

In an optional implementation of this embodiment, the $K_2$ sets of pilot resources of the second type are a subset of the $K_1$ sets of pilot resources of the first type, and $K_2$ is less than or equal to $K_1$. When the $K_1=1$, the first type of feedback information includes at least one of: channel quality indication information, channel rank indication information, pre-coding indication information, equivalent channel matrix information, equivalent channel feature vector information, and equivalent channel covariance matrix information.

Optionally, the first acquiring module is further configured to acquire, via a physical layer signaling and/or a higher layer signaling, release information and activation information of pilot resources except the pilot resources of the second type among the pilot resources of the first type.

Optionally, the apparatus in this embodiment may further include: a first prohibiting module, configured to prohibit, after the first acquiring module acquires the release information of the pilot resources except the pilot resources of the second type among the pilot resources of the first type, measuring or feeding back, on the released pilot resources, the second type of feedback information; and a releasing module, configured to measure or feed back, on the activated pilot resources, the first type of feedback information after the first acquiring module acquires the activation information of pilot resources except the pilot resources of the second type among the pilot resources of the first type.

Optionally, the apparatus in this embodiment may further include: a second acquiring module, configured to acquire from the pilot resources of the first type, via a physical layer signaling and/or a higher layer signaling, resource subset information serving as the pilot resources of the second type; and a second prohibiting module, configured to feed back, on resources indicated by the resource subset information, the second type of feedback information, and prohibit feeding back the second type of feedback information outside of the resources indicated by the resource subset information.

It is to be noted that this embodiment also provides a terminal corresponding to the apparatus for information feedback in this embodiment. The terminal includes:

a processor;

a memory configured to store a processor-executable instruction; and a transfer apparatus configured to perform data interaction with outside.

The processor is configured to control the transfer apparatus to acquire $K_1$ sets of pilot resources of a first type transmitted by a base station in a first transmission mode and $K_2$ sets of pilot resources of a second type transmitted by the base station in a second transmission mode. The processor is further configured to feed back a first type of feedback information to the base station according to measurement of the pilot resources of the first type, and feed back a second type of feedback information to the base station according to measurement of the pilot resources of the second type. Both $K_1$ and $K_2$ are integers equal to or greater than 1.

It is to be explained that explanations to the pilot resources of the first type, the pilot resources of the second type, the first transmission mode, the second transmission mode, and values of $K_1$ and $K_2$ involved in the base station correspond to corresponding explanations in the embodiment 1, and thus are not repeated any more herein.

Furthermore, the processor, the memory and the transfer apparatus also may be used for executing functions of other modules in the above apparatus for information feedback.

Embodiment 5

This embodiment provides a system for pilot configuration and information feedback, which includes the apparatus in the embodiment 3 and the apparatus in the embodiment 4.

It is to be noted that the above modules may be implemented by means of software or hardware. The latter implementation means may be implemented in the following ways, but not limited thereto: all the above modules are positioned in the same processor; or the above modules are respectively positioned in different processors in any combination form.

Embodiment 6

Figure 6:
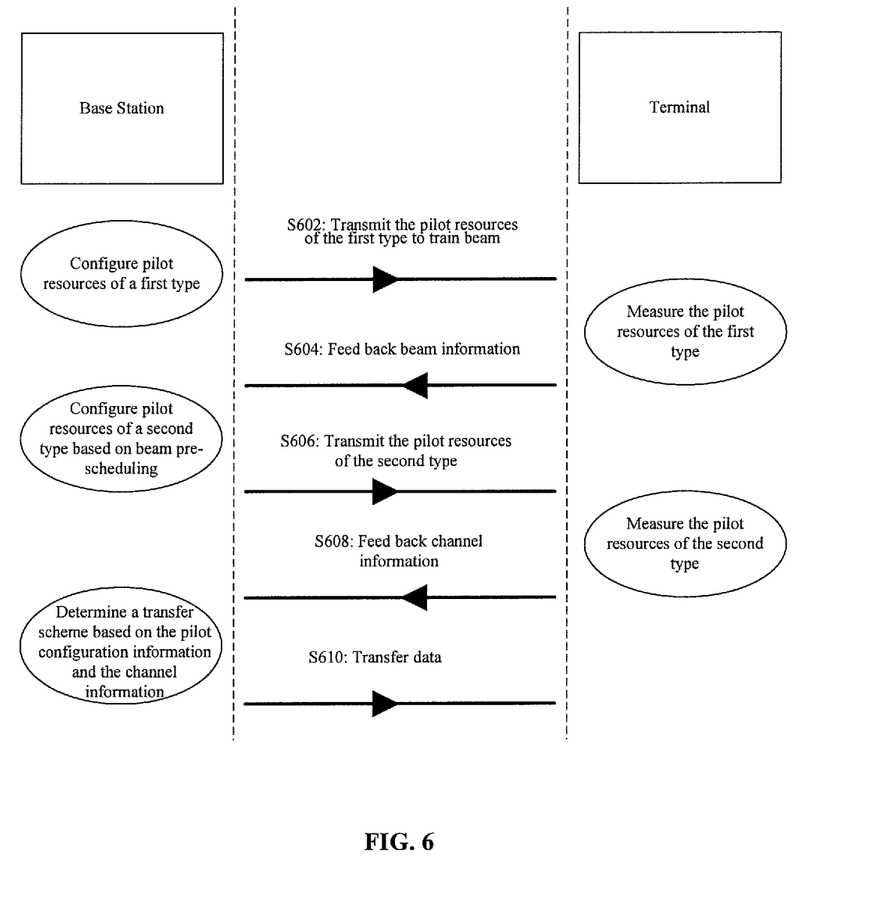
FIG. 6 is a schematic diagram I of a procedure of acquiring CSI before whole data transfer according to an embodiment of the present invention.

This embodiment provides specific implementations for pilot configuration and channel information feedback. The focus of this embodiment is a procedure of acquiring CSI before data transfer. FIG. 6 is a schematic diagram I of the procedure of acquiring the CSI before whole data transfer according to an embodiment of the present invention. As shown in FIG. 6, steps of this acquiring procedure include following steps.

In Step S602, a base station configures pilot resources of a first type and transmits the pilot resources of the first type to a terminal to train beam.

In Step S604, the terminal measures the pilot resources of the first type and feeds back beam information.

In Step S606, the base station configures pilot resources of a second type based on beam pre-scheduling, and sends the pilot resources of the second type to the terminal.

In Step S608, the terminal measures the pilot resources of the second type and feeds back channel information.

In Step S610, the base station determines a transfer scheme based on the beam information and the channel information and transfers data to the terminal.

As can be seen from the above Step S602 and Step S610, the base station configures the pilot resources of the first type for beam training, and informs the terminal of pilot resource configuration information via the physical layer signaling or the higher layer signaling. The terminal feeds back, by measurement, one or more pieces of optimum beam information. After receiving the feedback from the terminal, the base station carries out a preliminary dispatching, including a preliminary MU pairing, based on the beam information fed back, configures the pilot resources of the second type, transmits the pilot resources of the second type on these resources to further obtain CSI, and informs the terminal of the pilot resource configuration information via the physical layer signaling. The terminal measures, on the pilot resources of the second type, channel information, and carries out a second type of CSI feedback. After receiving the second type of CSI feedback, the base station may determine a final data transfer scheme, including the precoding matrix used for data transfer, etc.

In a high-frequency MIMO system, a hybrid precoding composed of a radio frequency precoding and a baseband precoding may be used for solving problems of large high-frequency channel fading and high path loss. As shown in FIG. 1, the base station may obtain, by beam training, a suitable hybrid beam forming $F_{RF}F_{BB}$. In addition, because the range of action of analog precoding is the entire bandwidth, at least multiple sets of precoding pilot resources are required to complete the hybrid beam training. In the beam training phase, a simple method for beam training is to transmit, by the base station, pilot frequency on multiple sets of pilot resources, wherein each pilot frequency occupies one pilot resource, and each pilot frequency is a pilot frequency using precoding. The pilot resources described herein include time and frequency domain resources of the pilot frequency, for example, the frequency domain subcarrier position of the pilot frequency, the OFDM symbol position occupied by the pilot frequency, the time unit location where the pilot frequency is, and the like. The pilot resources further include a port of the pilot frequency, the sequence ID of the pilot frequency, the precoding matrix of the pilot frequency, and so on. Specifically, the beam information fed back by the terminal may be a time-frequency resource ID, a port ID, a sequence ID, a pre-coded ID and the like of the pilot frequency occupied by the beam. After receiving the pilot frequency sent from the base station, the terminal measures, on the corresponding pilot resources, the channel quality, and feeds back, to the base station, a plurality of better beam directions measured by the terminal. That is, the number of beams fed back by UE depends on the measurement result. After receiving the pilot resource information fed back by the terminal, the base station may make a preliminary judgment on the channel state information of the UE. That is, the base station may know the plurality of better beam directions of the UE. Based on the preliminary channel information, the base station may make a preliminary prediction for user pairing in the data transfer phase, and schedule the predicted paired users to transmit the pilot resources of the second phase. The configuration of the pilot resources of the second phase depends on: 1. feedback, in the first phase, of the user scheduled by the base station in the second phase to perform CSI measurement; and 2. user pairing situation in the second phase. That is, based on jointly making CSI measurement by multiple users and data transfer pairing situation, the base station adjusts the information fed back by the user in the first phase, and then configures the pilot resources of the second phase. For example, the base station is configured with six pilot ports. After beam training, the terminal A feeds back four pieces of beam information, and the terminal B feeds back four pieces of beam information. The beam information fed back by the two terminals is not overlapped, and has a better space division effect. The base station pairs the two terminals together by using beam information and a MU pairing algorithm for further CSI measurement and data transfer. However, the base station only has six ports, and thus it is impossible to perform, on the same resource, a MU pairing on the terminal A and the terminal B of eight beams in total. Therefore, the base station needs to dynamically adjust the number of ports, of the terminal A and the terminal B, used for acquiring the second-phase CSI. One method is as below: 2-port pilot resources are configured for the terminal A, 4-port pilot resources are configured for the terminal B, then the 2-port pilot resources and the 4-port pilot resources are configured based on the first-phase CSI fed back by the terminal A and the terminal B, and on this basis, the second-stage pilot resources are sent, and second-stage CSI is acquired. Through two-step procedures of acquiring the CSI, the accuracy of the CSI when performing the MU pairing may be increased, and a higher CSI acquisition efficiency may be obtained.

Reference is made below with reference to specific implementations of this embodiment.

Optional Implementation I

Figure 7:
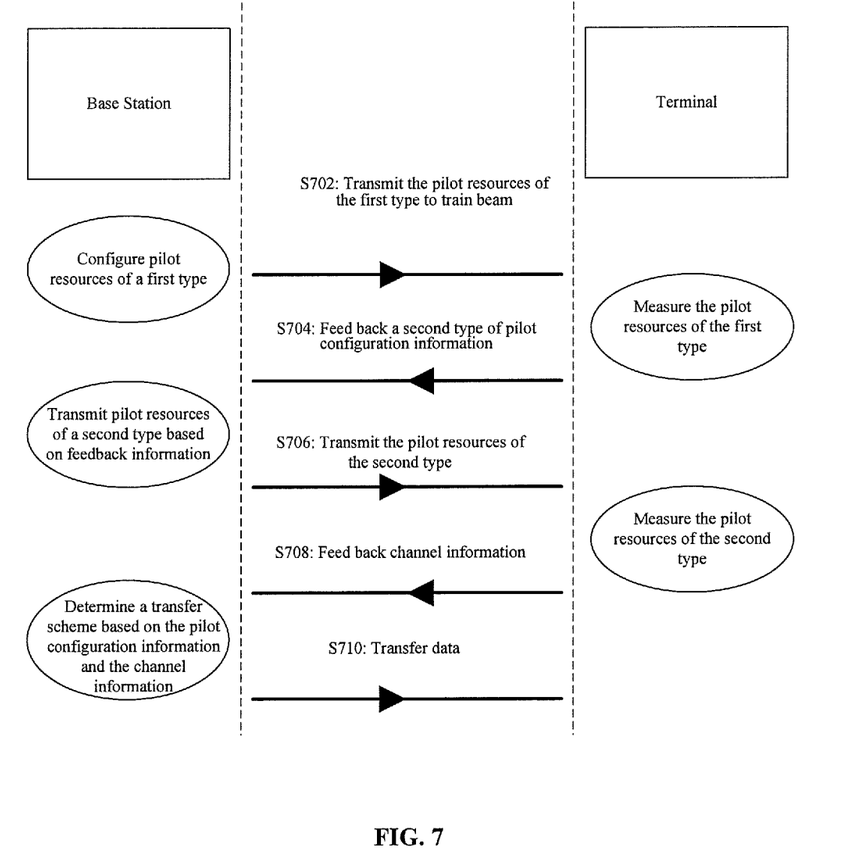
FIG. 7 is a schematic diagram II of a procedure of acquiring the CSI before the whole data transfer according to an embodiment of the present invention.

This implementation provides a specific implementation of a first type of CSI. In the embodiment I, what is fed back by the terminal in the first type of CSI is pilot resource information indicating beam information or the like. This embodiment provides a method for feeding back, by the terminal in the first type of CSI, a second type of pilot resource configuration information recommended by the terminal. FIG. 7 is a schematic diagram II of a procedure of acquiring the CSI before the whole data transfer according to an embodiment of the present invention. As shown in FIG. 7, steps of this acquisition procedure includes following steps.

In Step S702, a base station configures pilot resources of a first type and transmits the pilot resources of the first type to the terminal to train beam.

In Step S704, the terminal measures the pilot resources of the first type and feeds back a second type of pilot configuration information to the base station.

In Step S706, the base station transmits, based on feedback information, pilot resources of a second type to the terminal.

In Step S708, the terminal measures the pilot resources of the second type and feeds back channel information to the base station.

In Step S710, the base station determines a transfer scheme based on the pilot configuration information and the channel information and transfers data.

After the terminal performs beam training on the pilot resources of the first type and obtains one or more better beam directions, the terminal needs to inform the base station of the pilot resources where these beam directions are, such that the base station can configure the pilot resources of the second type. Therefore, an effective method is as below. That is, the terminal directly feeds back to the base station, based on a beam training result, recommended configuration information of the pilot resources of the second type, including a time-frequency resource location when configuring the pilot resources of the second type, precoding configuration, port configuration, etc. These pilot resources may be a subset selected from the pilot resources of the first type. After obtaining the feedback information, the base station may directly configure a second set of pilot resources, and may even not inform the terminal of the resource information, whereas the terminal directly measures, on the resource indicated by the recommended pilot resource configuration information, the pilot resources of the second type. In this way, beneficial effects of saving the signaling overhead and lifting the overall efficiency can be achieved.

Optional Implementation II

This embodiment provides a specific implementation of configuration of pilot resource transmission mode. Embodiment I focuses on the process of acquiring the CSI before data transfer. After the beginning of the data transfer, a channel may be changed due to fast fading, movement and blocking of the terminal or the like. Therefore, the pilot resources need to be transmitted for many times in a certain manner to adapt to the change of channel. One pilot resource transmission mode is a periodic pilot resource transmission. The pilot resources of the first type used for beam training are periodically transmitted, and beam information may be updated by periodic beam training, which may enhance hybrid beamforming and beam-based user scheduling performance. The pilot resources of the second type are periodically transmitted, which may enhance the performance of acquiring the CSI for each user. Since the pilot resources are periodically transmitted, the resource information transmitted through the pilot resources is relatively fixed. Therefore, the base station may semi-statically inform, via the higher layer signaling, the terminal of the configuration information of the periodic pilot resources, which may reduce the signaling overhead. In addition, since the pilot resources of the second type are determined based on the first type of feedback information, when the pilot resources of the second type are periodically transmitted, the pilot resources may be effectively configured in two ways. In the first way, the pilot resources may be dynamically configured via the physical layer signaling to adapt to the dynamic change, in the configuration of the pilot resources of the second type, caused by the first type of feedback. In the second way, when the pilot resources are configured, the number of times of transmitting the pilot resources is obtained. That is, the base station calculates out, based on the period of the pilot resources of the first type and the period of the pilot resources of the second type, the number of times of transmitting the pilot resources of the second type. When a preset number of times of transmitting the pilot resources of the second type is reached, the pilot resources of the second type are released, and the pilot resources of the second type are reconfigured based on the latest first type of feedback information. In another pilot resource transmission mode, transmission of the pilot resources is triggered acyclically. The base station may determine a link quality based on feedback from the terminal. If the link quality drops significantly, the base station may trigger to transmit the acyclical pilot resources of the first type. After the beam training is completed, CSI calculation and feedback are performed by triggering the acyclical pilot resources of the second type. Both the acyclical pilot resources of the first type and the acyclical pilot resources of the second type are dynamically informed via the physical layer signaling. In this way, both the efficiency and the flexibility of the pilot resources may be increased. In addition, after data transfer, two types of pilot resources exist on different resources at different moments. Therefore, the base station may be configured to indicate, via the higher layer signaling or the physical layer signaling, whether each piece of pilot resources belongs to the pilot resources of the first type or the pilot resources of the second type.

Optional Implementation III

This implementation provides a specific implementation for configuration of pilot resources. This embodiment provides a special case of the configuration of the pilot resources of the second type, wherein the pilot resources of the second type are a subset of the pilot resources of the first type. At this moment, the base station may only configure the pilot resources of the first type, and the base station and the terminal agree to divide, the pilot resources of the first type into a plurality of subsets in a certain way. The terminal feeds back one subset of the pilot resources of the first type. After receiving the first type of feedback from the terminal, the base station configures, based on the feedback of the terminal, one subset of the pilot resources of the first type to transmit the pilot resources of the second type. There are two methods for the base station to configure the pilot resources of the second type. According to the first method, the base station directly informs, via a signaling, the terminal which subset is used. This signaling may be higher layer signaling or a physical layer signaling to adapt to periodic or aperiodic transmission of the pilot resources of the second type. According to the second method, the base station releases, via the higher layer signaling or the physical layer signaling, pilot resources that are not used by the pilot resources of the second type, and the terminal only measures and calculates the second type of feedback information on unreleased pilot resources. When required, the released resources are reactivated via the higher layer signaling or the physical layer signaling to transmit new pilot resources of the first type and update the first type of feedback information. In this way, the signaling overhead may be reduced, and the efficiency of acquiring the CSI may be enhanced. It is worth noting that there is a special case, that is, when the pilot resources of the first type only occupy one set of pilot resources, it may be considered that single-beam transmission is performed. Acquiring all the CSIs may be achieved by using the pilot resources of the first type, and thus pilot resources of the second type are not needed any more.

Embodiment 7

This embodiment provides a specific implementation for pilot configuration and information feedback. This embodiment focuses on a specific implementation when receiving beam exists in the terminal. The receiving beam refers to receiving a signal by using $W_{RF}W_{BB}$ in FIG. 1.

Figure 8:
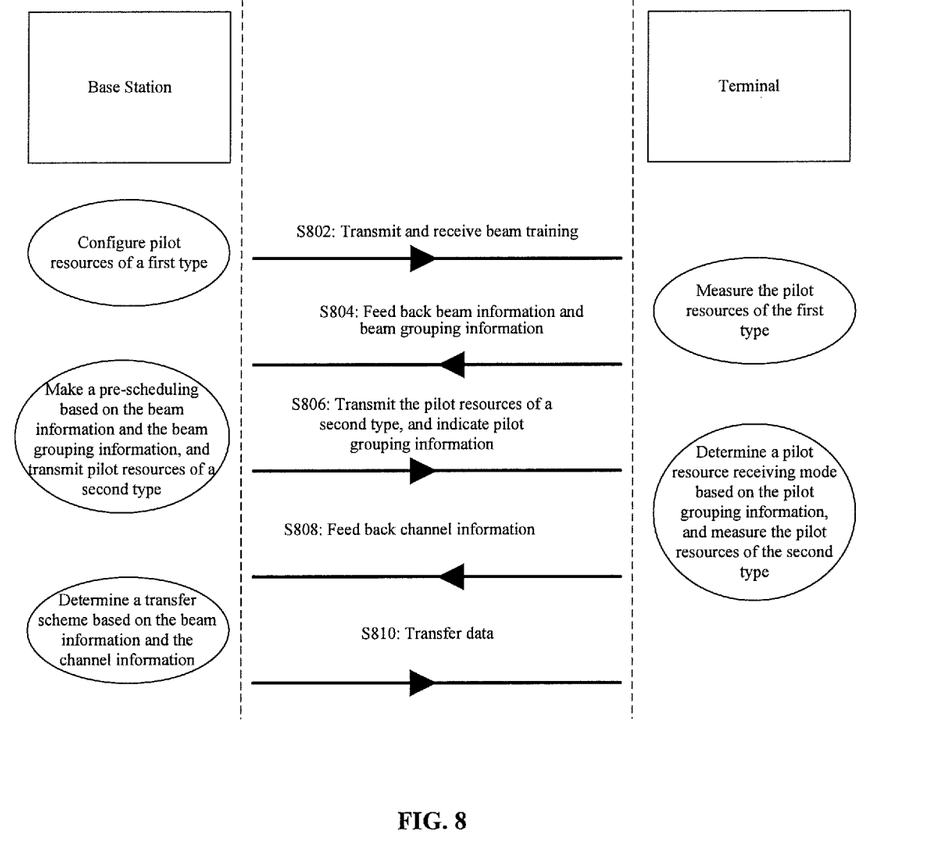
FIG. 8 is a schematic diagram of a procedure of acquiring the CSI according to an embodiment of the present invention.

FIG. 8 is a schematic diagram of a procedure of acquiring the CSI according to an embodiment of the present invention. As shown in FIG. 8, this acquisition procedure includes following steps.

In Step S802, the base station configures pilot resources of a first type, and transmits beam training to a terminal or receives the beam training transmitted by the terminal.

In Step S804, the terminal measures the pilot resources of the first type and feeds back beam information and beam grouping information to the base station.

In Step S806, the base station makes a pre-scheduling based on the beam information and the beam grouping information, transmits pilot resources of a second type, and transmits, to the terminal, the pilot resources of the second type indicative of pilot grouping information.

In Step S808, the terminal determines a pilot resource receiving mode based on the pilot grouping information, measures the pilot resources of the second type and feeds back channel information to the base station.

In Step S810, the base station determines a transfer scheme based on the beam information and the channel information and transfers data to the terminal.

When a receiving beam exists in the terminal, the base station expands each pilot resource to a plurality of pilot resources in a repeated manner when configuring the pilot resources of the first type. When receiving these pilot resources, the terminal respectively uses unused receiving beams for the plurality of pilot resources configured with the same beam, and determines the optimal beam receiving direction based on channel measurement. Furthermore, by receiving and measuring all the pilot resources of the first type of, the terminal may obtain a plurality of better base station transmitting beam directions and corresponding terminal receiving beam directions, groups the transmitted beams based on different receiving beams, and groups the transmitted beams having the same receiving beam into the same group. When the transmitted beams are fed back, grouping information thereof are also fed back. After receiving the feedback, the base station performs a pre-scheduling based on the optimal beam obtained from the feedback, and configures the pilot resources of the second type. When transmitting the pilot resources of the second type, the base station informs, via the physical layer signaling or the higher layer signaling, the terminal of grouping information, of each pilot resources among the pilot resources of the second type, in the first type of feedback information. After receiving the pilot resources of the second type, the terminal selects a receiving beam based on the pilot resource grouping information configured by the base station, and feeds back the second type of channel state information through channel measurement. After receiving the second type of feedback, the base station may complete the entire procedure of acquiring the CSI. By introducing the receiving beam of the terminal, the beamforming gain may be further increased to obtain a higher transmission rate.

Optionally, reference may be made to examples as recited in the above embodiments and alternative embodiments for specific examples in this embodiment, which is not repeated any more herein.

Apparently, those skilled in the art should understand each of the foregoing modules or steps of the present disclosure may be realized with general computing devices, they may be concentrated on a single computing device, or distributed in a network constituted by a plurality of computing devices, optionally they may be realized with program codes executable by computing devices, thereby they may be stored in storage devices and executed by computing devices, and in some cases, the steps as shown or described may be performed in sequences different from the sequences herein, or they may be made into IC modules, or a plurality of modules or steps among them are made into a single IC module. In this way, the present disclosure is not limited to the combination of any specific hardware and software.

The above are merely preferred embodiments of the present disclosure and are not intended to limit the present disclosure. To those skilled in the art, the present disclosure may have various modifications and changes. All modifications, equivalent substitutions and improvements made within the spirit and principle of the present disclosure shall fall within the protection scope of the present disclosure.

What is claimed is:

1. A method for pilot configuration, comprising:
   configuring, by a base station, $K_1$ sets of pilot resources of a first type;
   transmitting, by the base station, the $K_1$ sets of pilot resources of the first type to a terminal in a first transmission mode;
   receiving, by the base station, a first type of feedback information fed back by the terminal according to measurement of the pilot resources of the first type;
   determining, by the base station, based on the first type of feedback information, $K_2$ sets of pilot resources of a second type, wherein the $K_2$ sets of pilot resources of the second type are a subset of the K1 sets of pilot resources of the first type;

transmitting, by the base station, the $K_2$ sets of pilot resources of the second type to the terminal in a second transmission mode; and receiving, by the base station, a second type of feedback information fed back by the terminal according to measurement of the pilot resources of the second type;

wherein $K_1$ and $K_2$ are integers equal to or greater than 1, and $K_2$ is less than or equal to $K_1$.

2. The method according to claim 1, wherein the pilot resources of the first type and the pilot resources of the second type respectively comprise at least one of: pilot occupation time-frequency resources, a pilot port, a pilot sequence, and a pilot use precoding matrix.

3. The method according to claim 1, wherein
the first type of feedback information comprises at least one of: N sets of pilot resource indication information, pilot resource grouping indication information, and a second type of pilot resource information recommended by the terminal; and
wherein N is an integer greater than or equal to 1, and N is less than or equal to $K_1$.

4. The method according to claim 3, wherein the second type of pilot resource information recommended by the terminal comprises at least one of: a time/frequency domain resource location for transmitting a second type of pilot frequency recommended by the terminal, a port for transmitting the second type of pilot frequency recommended by the terminal, a second type of pilot sequence information recommended by the terminal, a second type of pilot use precoding information recommended by the terminal, and a second type of pilot resource grouping information recommended by the terminal.

5. The method according to claim 1, wherein the second type of feedback information comprises at least one of: channel quality indication information, channel rank indication information, pre-coding indication information, equivalent channel matrix information, equivalent channel feature vector information, and equivalent channel covariance matrix information.

6. A method for information feedback, comprising:
acquiring, by a terminal, $K_1$ sets of pilot resources of a first type transmitted by a base station in a first transmission mode;
feeding back, by the terminal, a first type of feedback information to the base station according to measurement of the pilot resources of the first type;
acquiring, by the terminal, $K_2$ sets of pilot resources of a second type transmitted by the base station in a second transmission mode; wherein the $K_2$ sets of pilot resources of the second type are determined by the base station based on the first type of feedback information, and a subset of the K1 sets of pilot resources of the first type; and
feeding back, by the terminal, a second type of feedback information to the base station according to measurement of the pilot resources of the second type;
wherein $K_1$ and $K_2$ are integers equal to or greater than 1, and $K_2$ is less than or equal to $K_1$.

7. The method according to claim 6, wherein
the pilot resources of the first type and the pilot resources of the second type respectively comprise at least one of: pilot occupation time-frequency resources, a pilot port, a pilot sequence, and a pilot use precoding matrix.

8. The method according to claim 7, wherein
the first type of feedback information comprises at least one of: N sets of pilot resource indication information, pilot resource grouping indication information, and a second type of pilot resource information recommended by the terminal; and
wherein N is an integer greater than or equal to 1, and N is less than or equal to $K_1$.

9. The method according to claim 8, wherein
the second type of pilot resource information recommended by the terminal comprises at least one of: a time/frequency domain resource location for transmitting a second type of pilot frequency recommended by the terminal, a port for transmitting the second type of pilot frequency recommended by the terminal, a second type of pilot sequence information recommended by the terminal, a second type of pilot use precoding information recommended by the terminal, and a second type of pilot resource grouping information recommended by the terminal.

10. The method according to claim 6, wherein
the second type of feedback information comprises at least one of: channel quality indication information, channel rank indication information, pre-coding indication information, equivalent channel matrix information, equivalent channel feature vector information, and equivalent channel covariance matrix information.

11. The method according to claim 6, wherein
when the first transmission mode is a periodic transmission mode, the terminal acquires the pilot resources of the first type via at least one of a physical layer signaling and a higher layer signaling transmitted by the base station; and
when the second transmission mode is the periodic transmission mode, the terminal acquires, via the at least one of the physical layer signaling and the higher layer signaling transmitted by the base station, at least one of the pilot resources of the second type and information on the number of times of transmitting the pilot resources of the second type.

12. The method according to claim 6, wherein
the terminal acquires, via at least one of a physical layer signaling and a higher layer signaling, at least one of:
pilot resources measured by the terminal belonging to the pilot resources of the first type or the pilot resources of the second type;
a value of $K_1$ and a value of $K_2$, and the pilot resources of the first type and the pilot resources of the second type, and
at least one of pilot resource grouping information of the pilot resources of the second type, and mapping information between the pilot resources of the second type and the pilot resources of the first type.

13. The method according to claim 12, wherein
the terminal determines, based on the at least one of the pilot resource grouping information and the mapping information, a reception mode of the pilot resources of the second type.

14. The method according to claim 6, wherein when the $K_1=1$, the first type of feedback information comprises at least one of: channel quality indication information, channel rank indication information, pre-coding indication information, equivalent channel matrix information, equivalent channel feature vector information, and equivalent channel covariance matrix information.

15. The method according to claim 6, wherein
the terminal acquires, via at least one of a physical layer signaling and a higher layer signaling, release information and activation information of pilot resources except the pilot resources of the second type among the pilot resources of the first type.

16. The method according to claim 15, wherein
when the terminal acquires the release information of the pilot resources except the pilot resources of the second type among the pilot resources of the first type, the terminal prohibits measuring or feeding back, on the released pilot resources, the second type of feedback information; and
when the terminal acquires the activation information of pilot resources except the pilot resources of the second type among the pilot resources of the first type, the terminal measures or feeds back, on the activated pilot resources, the first type of feedback information.

17. The method according to claim 6, further comprising:
acquiring, by the terminal via at least one of a physical layer signaling and a higher layer signaling, resource subset information serving as the pilot resources of the second type from the pilot resources of the first type; and
feeding back, by the terminal on resources indicated by the resource subset information, the second type of feedback information, and prohibiting the terminal from feeding back the second type of feedback information outside of the resources indicated by the resource subset information.

18. A base station, comprising:
a processor; and
a memory configured to store a processor-executable instruction;
wherein the processor is configured to perform the method for pilot configuration of claim 1.

19. A terminal, comprising:
a processor;
a memory configured to store a processor-executable instruction; and
a transfer apparatus configured to perform data interaction with outside;
wherein the processor is configured to:
control the transfer apparatus to acquire $K_1$ sets of pilot resources of a first type transmitted by a base station in a first transmission mode;
feed back a first type of feedback information to the base station according to measurement of the pilot resources of the first type;
control the transfer apparatus to acquire $K_2$ sets of pilot resources of a second type transmitted by the base station in a second transmission mode; wherein the $K_2$ sets of pilot resources of the second type are determined by the base station based on the first type of feedback information, and a subset of the K1 sets of pilot resources of the first type; and
feed back a second type of feedback information to the base station according to measurement of the pilot resources of the second type;
wherein $K_1$ and $K_2$ are integers equal to or greater than 1, and $K_2$ is less than or equal to $K_1$.

* * * * *